United States Patent [19]

Browning et al.

[11] 4,445,316
[45] May 1, 1984

[54] LOOSE VINE AND CANE ELIMINATOR

[75] Inventors: James T. Browning, Sunnyvale; Franklin P. Orlando, Morgan Hill, both of Calif.

[73] Assignee: FMC Corporation, Chicago, Ill.

[21] Appl. No.: 467,717

[22] Filed: Mar. 31, 1983

[51] Int. Cl.³ .............................................. A01D 46/00
[52] U.S. Cl. ...................................... 56/330; 56/16.5; 130/30 R
[58] Field of Search ...................... 56/14.3, 14.5, 16.5, 56/327 R, 330; 130/30 R, 30 P, DIG. 7; 171/26, 27, 40, 87, 89, 90, 101, 138

[56] References Cited

U.S. PATENT DOCUMENTS

| | | | |
|---|---|---|---|
| 515,171 | 2/1894 | Schaefer | 130/30 P |
| 799,911 | 9/1905 | Lofstam | 130/30 P |
| 2,277,450 | 3/1942 | Parr | 171/133 |
| 3,070,944 | 1/1963 | Peto et al. | 56/327 R |
| 3,931,823 | 1/1976 | Burton | 56/330 |
| 4,008,722 | 2/1977 | Jakobi | 130/DIG. 1 |
| 4,111,210 | 9/1978 | Freeman et al. | 56/327 R |
| 4,286,426 | 9/1981 | Orlando et al. | 56/330 |
| 4,336,682 | 6/1982 | Orlando | 56/330 |

Primary Examiner—Gene Mancene
Assistant Examiner—David L. Tarnoff
Attorney, Agent, or Firm—A. J. Moore; R. B. Megley

[57] ABSTRACT

A method and apparatus is disclosed for mechanically removing loose debris from harvesters such as grape harvesters moving along a row of living plants from which it dislodges grapes along with elongated canes and other debris, all of which are collected and moved rearwardly of the harvester to a debris collecting point. The grapes and some debris are then moved transversely outward from the living plants. At least one vine engaging finger is moved through the collecting point for engaging long pieces of debris, such as canes, and deflecting the canes into snagging engagement with the plants which pull the canes and other debris attached thereto free of the harvester as the harvester moves away from the snagged canes.

14 Claims, 14 Drawing Figures

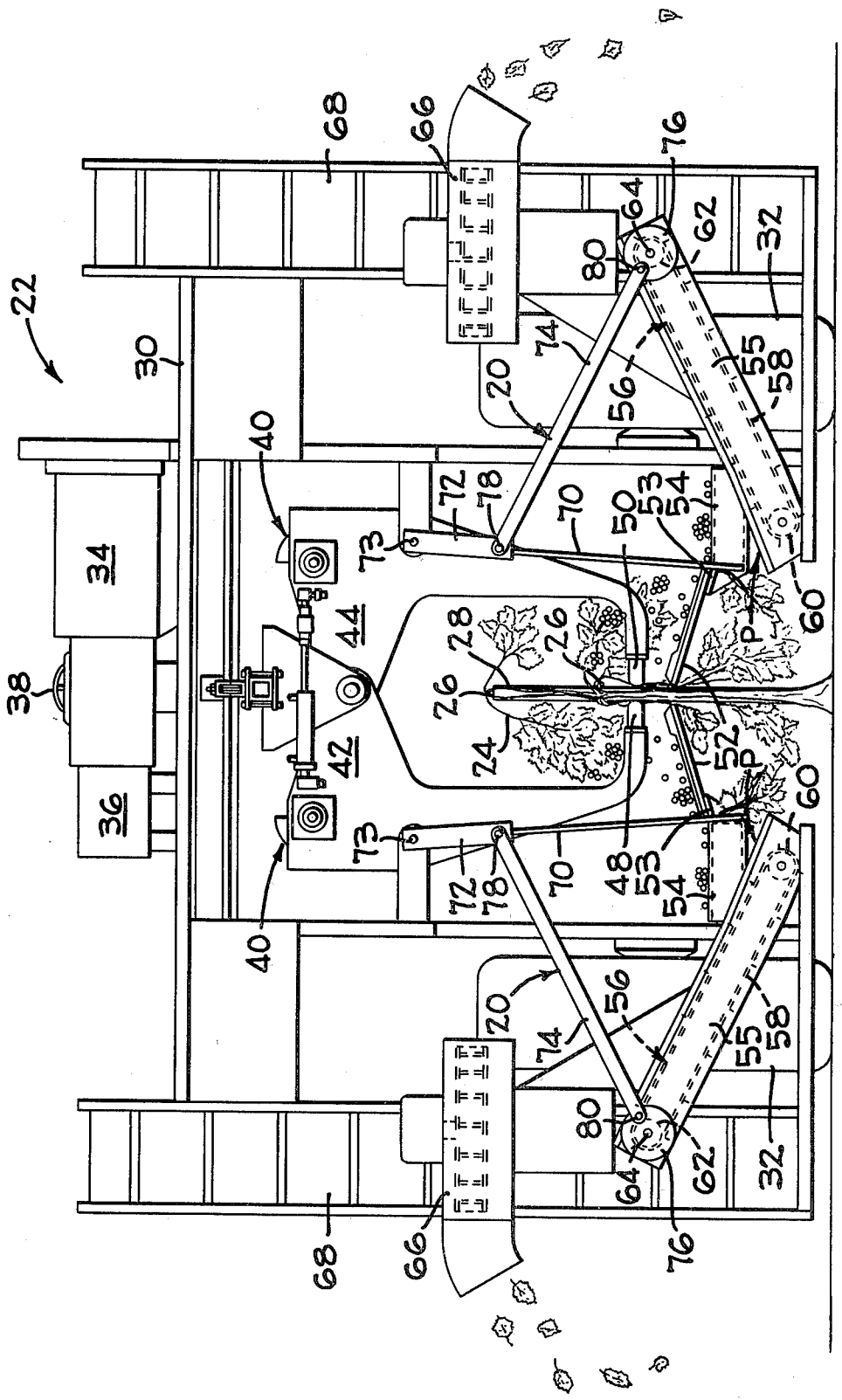
FIG_1

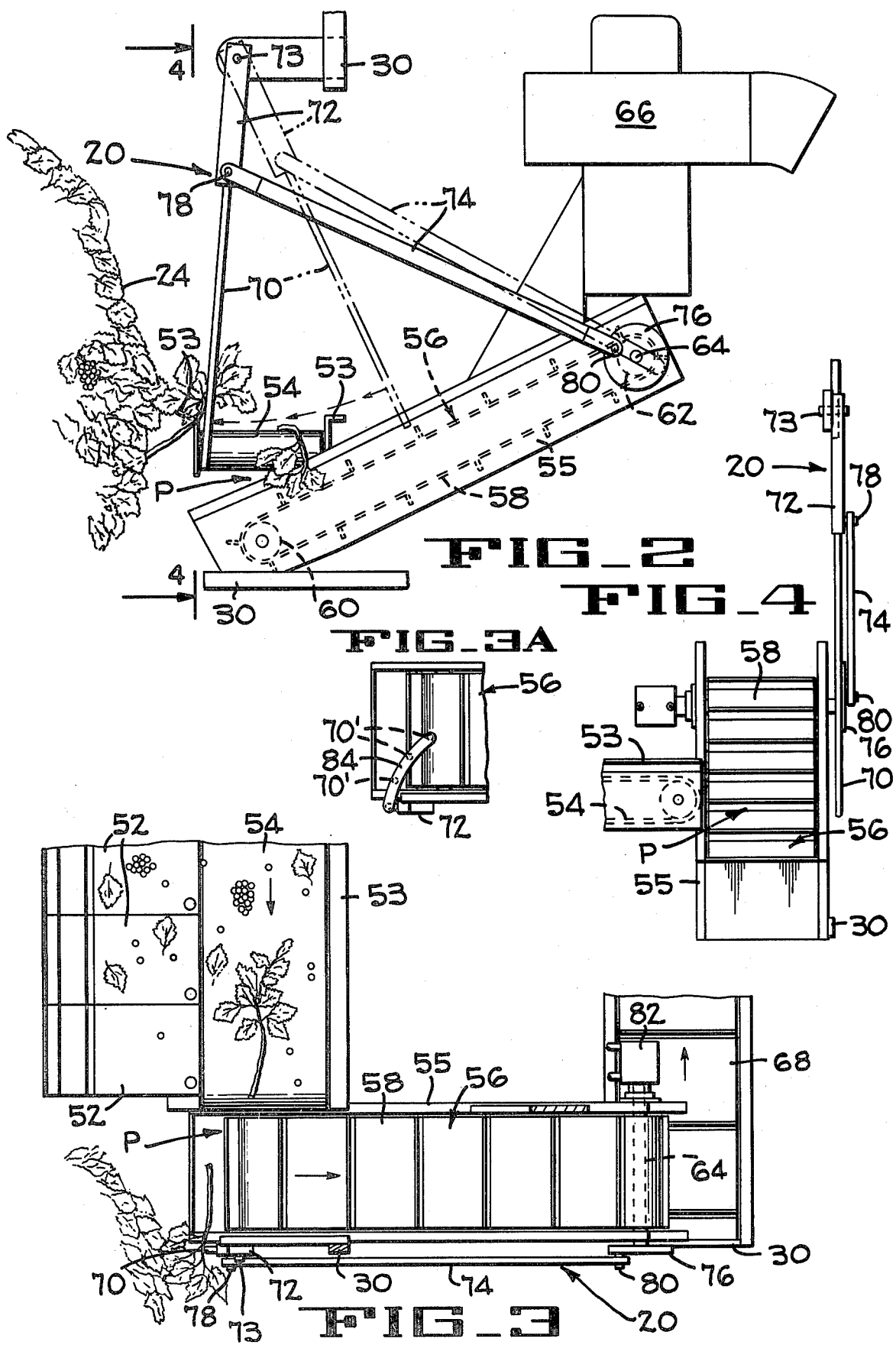

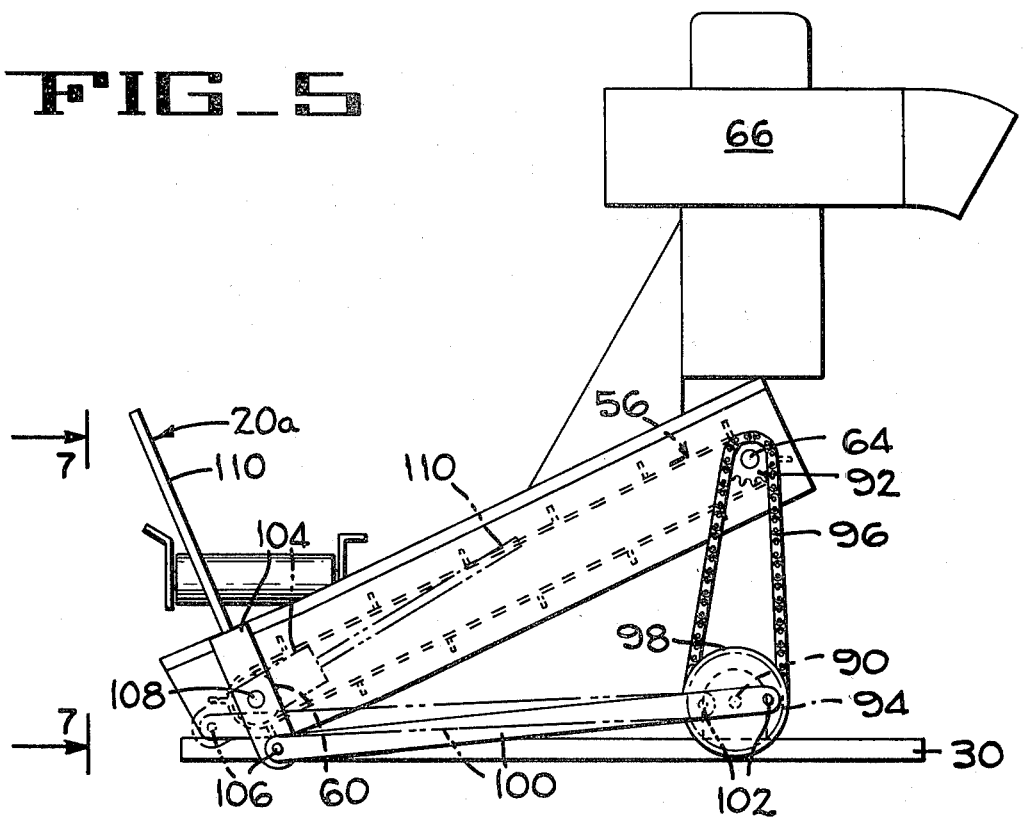
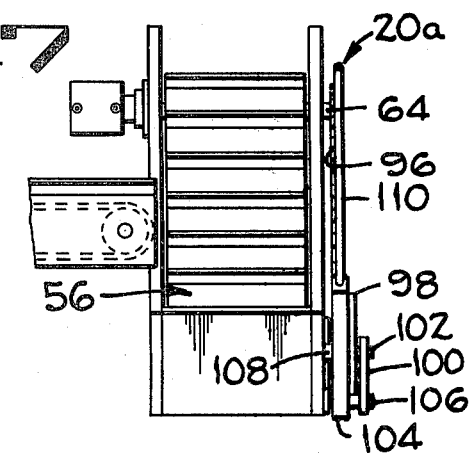
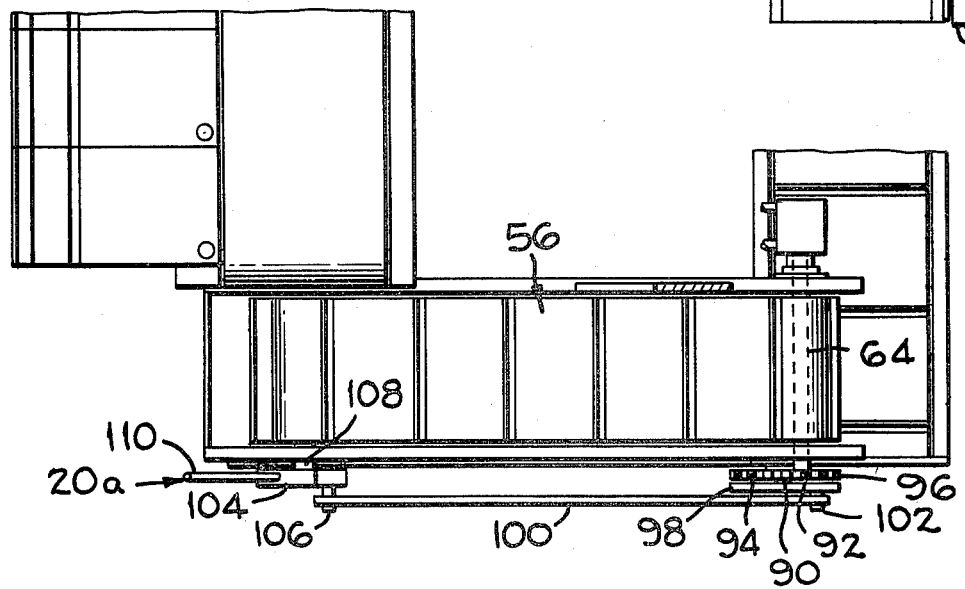

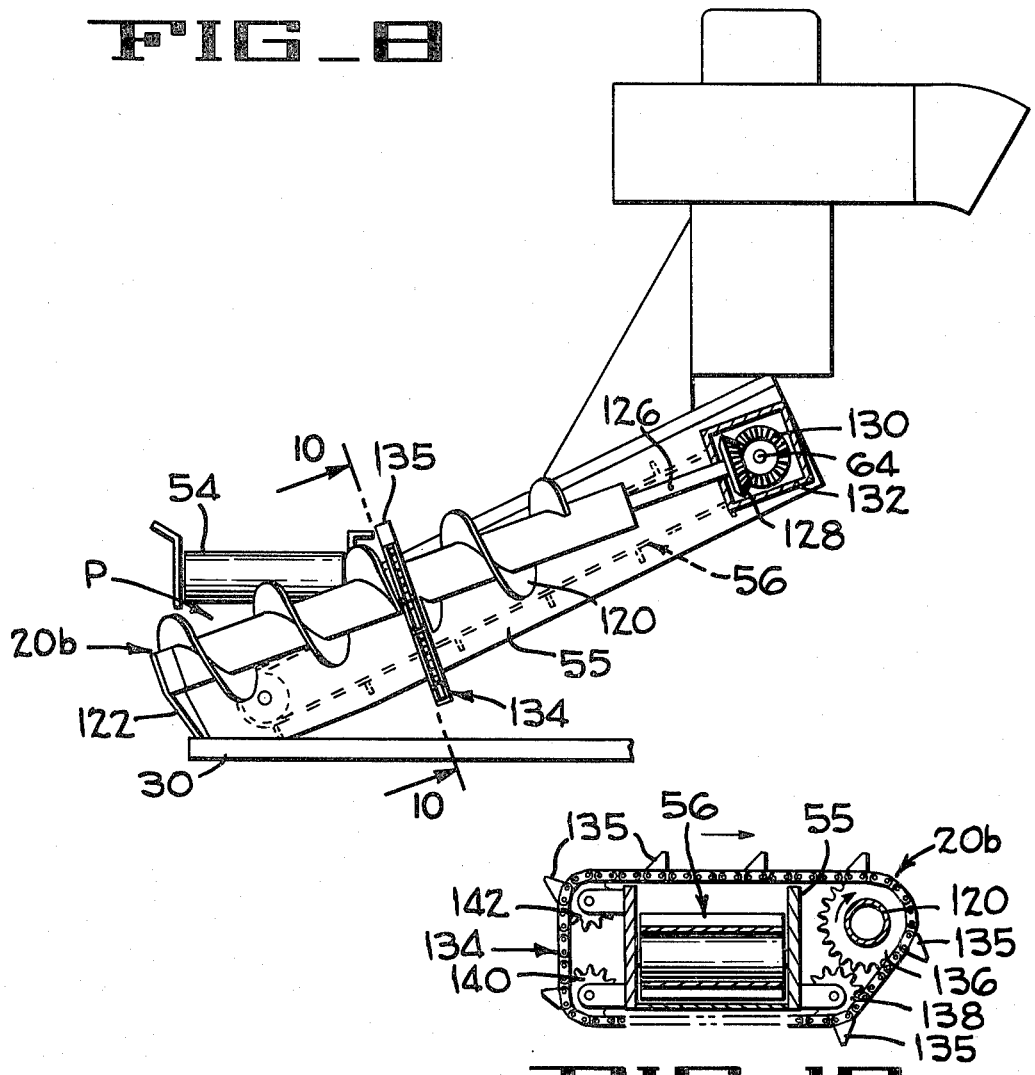
FIG_8
FIG_10
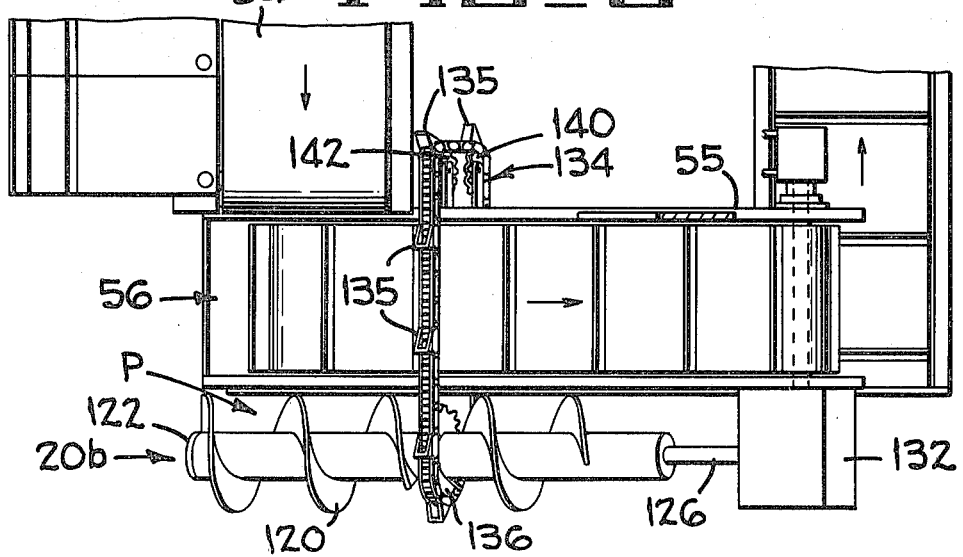
FIG_9

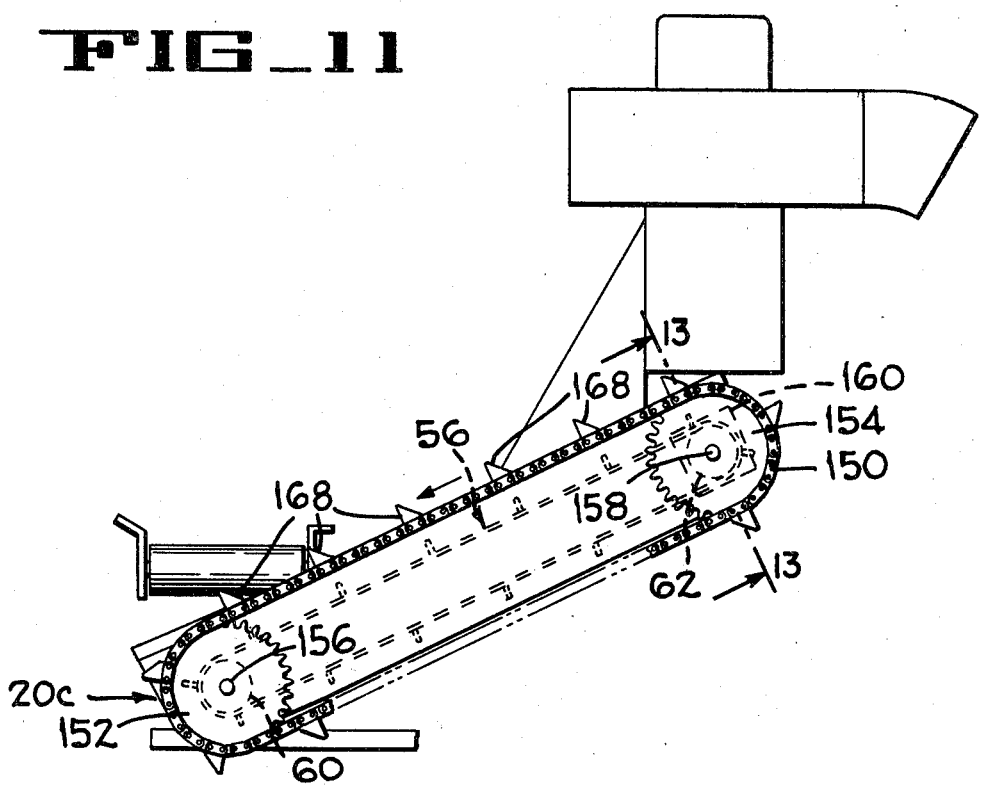
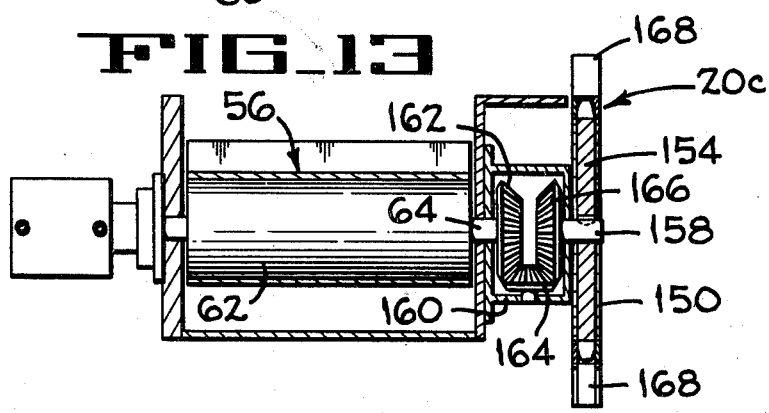
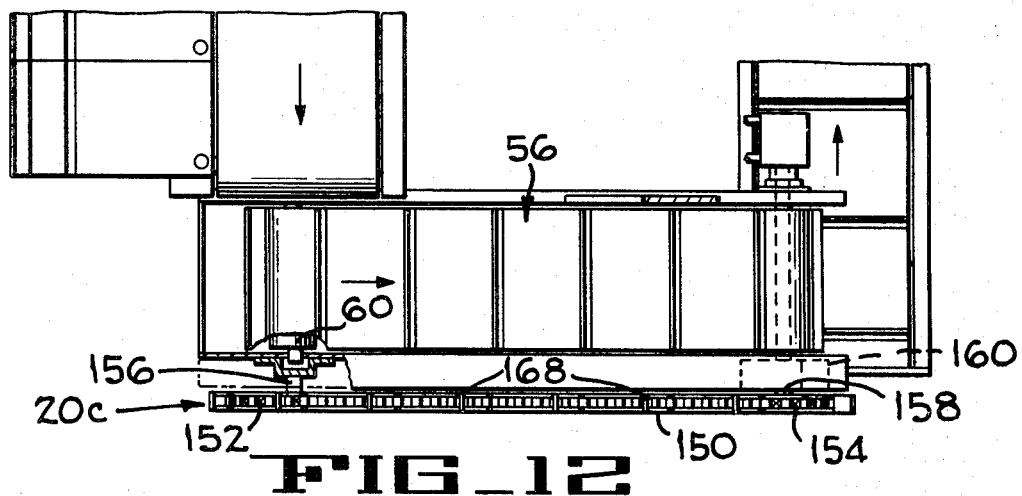

LOOSE VINE AND CANE ELIMINATOR

BACKGROUND OF THE INVENTION

1. Field of the Invention

The present invention relates to debris removal devices and more particularly relates to a method and apparatus for mechanically removing loose vines, canes, and other debris from harvesters or the like.

2. Description of the Prior Art

In harvesters such as grape harvesters having debris collection points, such as occur at the junction of cross conveyors; loose canes and other debris tend to collect which fouls the conveyors until the debris is removed. It has been the custom for two workers to ride on the rear of the harvester or to follow the harvester on foot, one on either side of the row, to watch for and manually remove loose vines, canes and other debris. The workers use their hands or are provided with poles, which they use to guide the canes and other debris away from the harvester before the debris interrupts the conveying process. The workers who walk behind or ride on the vehicle are also exposed to an extremely dusty atmosphere due to leaf and dust removal fans which remove light debris from the conveying system and also tend to raise a cloud of dust on the ground in the area of the workers.

The debris removal problem has also been attacked mechanically. Drag conveyors have been added to harvesters and are disposed in line and to the rear of the fruit collecting conveyors. However, the canes are usually oriented longitudinally of the collecting conveyors thereby making drag chains of the drag conveyors only partially effective. The objective of the drag conveyors is to pull the canes and debris over the back of the machine.

Assignee's Orlando et al U.S. Pat. No. 4,286,426 which issued on Sept. 1, 1981 and Orlando U.S. Pat. No. 4,336,682 which issued on June 29, 1982 disclose prior art grape harvesters upon which the loose vine and cane eliminators may be mounted. The disclosure of these two patents are incorporated by reference herein.

SUMMARY OF THE INVENTION

The method and apparatus of the present invention provide several embodiments of loose vine and cane removing apparatus, each of which includes a vine intercepting or propelling device which is disposed above a debris collecting point where the direction of travel of the debris changes about 90°, such as between two cross-conveyors or a conveyor and a chute on the harvester. When the harvester is driven along a row of plants being harvested, the loose vines and canes are moved transversely of the vehicle and are propelled or pressed into the plants being harvested. The growing plants or vines being harvested, snag, hold and drag the loose vines and canes from the harvester as the harvester moves forwardly along the row of plants and forwardly away from the snagged loose vines which then fall to the ground.

BRIEF DESCRIPTION OF THE DRAWINGS

FIG. 1 is a diagrammatic rear elevation of a grape harvester which incorporates a first embodiment of the vine and cane eliminator of the present invention.

FIG. 2 is an enlarged rear elevation of one of the loose vine and cane eliminators shown in FIG. 1, which eliminator is illustrated in two operative positions and a discharge elevator being removed.

FIG. 3 is a plan of the eliminator of FIG. 2.

FIG. 3A is a modification in plan of the first embodiment of the eliminator which uses a plurality of cane deflecting fingers rather than a single finger.

FIG. 4 is a side elevation looking in the direction of arrows 4—4 of FIG. 2.

FIG. 5 is a rear elevation of a second embodiment of the eliminator illustrated in two operative positions with the discharge elevator being removed.

FIG. 6 is a plan of the eliminator of FIG. 5.

FIG. 7 is a section looking in the direction of arrows 7—7 of FIG. 5.

FIG. 8 is a rear elevation of a third embodiment of the eliminator with the discharge elevator being removed.

FIG. 9 is a plan of the eliminator of FIG. 8.

FIG. 10 is a section taken along lines 10—10 of FIG. 8.

FIG. 11 is a rear elevation of a fourth embodiment of the eliminator with the discharge elevator removed.

FIG. 12 is a plan of the eliminator of FIG. 11.

FIG. 13 is a section taken along lines 13—13 of FIG. 11.

DESCRIPTION OF THE PREFERRED EMBODIMENT

The first embodiment of the loose vine and cane eliminator 20 (FIGS. 1-4) is shown mounted on the rear end of a grape harvester 22 which is driven along a row of grapevines 24 supported on one or more trellis wires 26 attached to spaced posts 28. The trellis wires 26 have portions of the canes and vines trained therearound so that the bunches of grapes hang down from the vines as is conventional in the art.

As used herein, the term "canes" refers to long leafy portions of grapevines. Many of the canes are trained over the upper trellis wire to shade fruit which is primarily supported from the lower trellis wire. It will be understood, however, that some grapes do grow on the canes and that some canes are trained around the lower trellis wire. The term "loose vines" refers to shorter pieces of vine which are broken from the growing vine during the harvesting operation and may be grapevines or other types of vines being harvested.

As used in the specification and claims it will be understood that the term "snagging" or "snagging engagement" includes any type of engagement between the canes and the plants in the row being harvested which frictionally or otherwise attach the canes to the plants with sufficient adherence to pull the canes free of the harvester in response to movement of the harvester away from the attached canes and debris.

The harvester 22 includes a main mobile frame 30 mounted on four wheels 32 (only two being shown). An engine 34 is coupled to hydraulic pump 36 to provide hydraulic fluid to a hydraulic system for controlling several hydraulic motors which drive at least two of the wheels 32 and several conveyors and elevators under the control of an operator seated at an operator's station 38 at the front of the harvester. The operator also controls hydraulic motors (not shown) which drive a shaker assembly 40 that includes four shaker frames 42,44, only the rear two frames being shown. Trunk striker bars 48,50 are connected to the lower ends of the frames 42,44, respectively, for shaking the vines 24 and thereby dislodging grapes, leaves, dust, canes and portions of the vine therefrom.

The grapes, leaves, canes and vine portions fall onto angled collector plates 52 (FIG. 1) which guide this removed product into channel shaped troughs 53 onto the upper runs of the associated collector conveyors 54. The upper run of each collector conveyor 54 is driven toward the rear of the harvester 22 and gravitationally discharges grapes at a debris collecting point P into the lower end of an associated cross conveyor trough 55 (FIGS. 2-4) onto the upper run of an associated cross conveyor 56 oriented transversely of the harvester. The debris collecting point P not only includes the space within the lower end of the cross conveyor trough 55, but also includes the space rearwardly of the cross conveyor since the canes and the other debris tend to extend over the rear end of the cross conveyor trough. Each cross conveyor 56 includes a cleated belt 58 trained around a lower roller 60 journaled in the trough 55 and around an upper roller 62 secured to a shaft 64 which is journaled in the cross conveyor trough 55 and extends outwardly from both sides thereof. Each cross conveyor 56 moves the product to a position below an associated suction fan 66 which removes light debris such as leaves and dust from the cross conveyor; while the grapes, canes and other heavier debris remain on the cross conveyor. The grapes, vines and canes then gravitate into a discharge elevator 68 disposed longitudinally on each side of the harvester 22 for discharge into bulk bins or the like carried by other vehicles (not shown).

The above described components of the harvester 22 are old in the art, and if a more detailed description of certain of the components is desired, reference may be made to the cross-referenced patents mentioned above.

Since vines and canes which are shaken and broken from the growing vines quite frequently jam the elevators 56 as previously mentioned, two loose vine and cane eliminators 20 of the present invention are mounted on the harvester 22 as shown in FIG. 1. Since both eliminators 20 include identical components, only the right eliminator 20 will be described in detail.

Having reference to FIGS. 2-4, each eliminator 20 of the first embodiment comprises at least one cane deflecting finger 70 rigidly secured to a bracket 72 which is pivoted to the vehicle frame 30 by a pivot pin 73 such as a bolt or the like. A crank arm 74 is pivotally connected between the finger mounting bracket 72 and a crank disc 76 by pivot pins 78 and 80, with the pin 80 being secured to the disc 76 at a point offset from the axis of the shaft 64. The disc 76 is rigidly secured to the elevator shaft 64.

As best shown in FIG. 3, the cross conveyor 56 may be driven by a hydraulic motor 82 coupled to the shaft 64 and secured to the harvester frame 30. If only one finger 70 is used, the finger is disposed outwardly of the rear wall of the cross conveyor trough 55. If more than one finger 70 is to be used, the bracket 72 is provided with a horizontal angle bar extension 84 (FIG. 3A) which is preferably arcuately shaped so that several fingers 70' will progressively engage long canes to urge them into the living vines 24 supported by the trellis wires 26.

In operation of the first embodiment of the loose vine and cane eliminator 20, the harvester 22 is started and is driven down a row of vines with all conveyors, elevators and fans also being driven. The harvester 22 shakes grapes, loose vines, loose canes, and other debris onto the driven collector conveyors 54 which move the product rearwardly to a debris collecting point P above the associated cross conveyor 56 for gravitational discharge into the lower end of the associated cross conveyor 56.

The hydraulic motor 82 drives the upper run of the cross conveyor 56 upwardly and outwardly, and also rotates the crank disc 76 which acts through the crank arm 74 to pivot the finger 70 (or fingers 70') between its dotted line and solid line position of FIG. 2. As mentioned previously, long canes or the like are aligned substantially longitudinally of the collector conveyor due to the movement of the conveyor and resistance of the canes being pulled over the conveyor trough 53. As the finger 70 is repeatedly moved from its retracted position toward the stationary growing vines 24, it contacts the canes and other debris as they drop into the cross conveyor 56 and then moves them away from the debris collecting point P into the stationary trellis supported vines which snag the canes and other debris thereby removing the debris from the harvester. After the harvester has moved away from the snagged debris, most of the debris immediately falls to the ground.

Although all embodiments of the loose vines and cane eliminators have been illustrated as being driven from the cross conveyor shaft 64, it will be apparent that other drive systems such as another motor, or a speed reducing sprocket-chain set may be used if a slower deflecting finger speed is desired.

A second embodiment of the loose vine and cane eliminator 20a is illustrated in FIGS. 5-7. The cane eliminator 20a comprises a cross shaft 90 journaled on the harvester frame 30. The drive shaft 64 of the cross conveyor 56 has a drive sprocket 92 secured thereto and connected to a driven sprocket 94 on the cross shaft 90 by a chain 96. An eccentric illustrated as a crank disc 98 is also secured to the cross shaft 90 and is pivotally connected to a crank arm 100 by an eccentrically mounted pivot pin 102. The other end of the crank arm 100 is pivotally connected to a finger mounting bracket 104 by a pivot pin 106. The bracket 104 is pivoted to an extension of a shaft 108 which supports the lower roller 60 of the cross conveyor 56. A cane deflecting finger 110 is positioned rearwardly of the cross conveyor trough 55 and is movable between a retracted position shown in dotted lines (FIG. 5) and a vine and cane removing position shown in solid lines.

The operator of the loose vine and cane eliminator 20a of the second embodiment of the invention is substantially the same as that described in regard to the first embodiment except that the finger 110 tends to lift the debris as it moves the debris and canes against the trellis supported vines. The removed canes and the other debris are snagged by the trellis supported vines and are pulled free from the harvester 22.

The third embodiment of the loose vine and cane eliminator 20b is illustrated in FIGS. 8-10. The eliminator 20b comprises an auger conveyor 120 which is journaled on the frame 30 of the harvester 22 by a bracket 122. A stub shaft 126 on the upper end of the auger 120 and the upper cross conveyor shaft 64 are connected together by bevel gears 128,130 in a gear box 132, thus driving the auger in a clockwise direction (FIG. 10). In the event canes are not immediately discharged at the debris collecting point P adjacent the lower end of the auger conveyor 120, but begin to move transversely outwardly of the harvester on the cross conveyor 56 along with bunches of grapes, a finger conveyor 134, which includes spaced fingers 135, is provided to intercept a portion of the outwardly moving canes and to propel them over the top of the auger conveyor for discharge directly to the ground rearwardly of the harvester. The finger conveyor 134 is trained around a sprocket 136 secured to an intermediate portion of the auger 120, and around idler sprockets 138,140 and 142 journaled on the frame 30 of the harvester so that the upper run moves toward the rear of the harvester and over both the cross conveyor 56 and its conveyor trough 55, while the lower run moves under the cross conveyor as best shown in FIG. 10.

The canes and other debris which gravitate from the collector conveyor 54 tend to stop in the debris collecting point P at the lower end of the cross conveyor 56. Accordingly, the lower portion of the auger conveyor 120 engages most of the canes and other debris, and either rotates the debris rearwardly over the auger for gravitation onto the ground, or will drive the debris toward the live trellis supported vines so that loose canes will be snagged by the vine and be removed from the harvester as the harvester moves away from the snagged debris.

The fourth embodiment of the loose vine and cane eliminator 20c is illustrated in FIGS. 11-13. In this embodiment of the invention the loose vine and cane eliminator 20c comprises a narrow endless finger conveyor 150 such as a belt or chain trained around large diameter sprockets 152,154 journaled on stub shafts 156,158 which are secured to the rear wall of the cross conveyor trough 55 concentric with the axes of the cross conveyor rollers 60,62 (FIGS. 12 and 13), respectively.

The upper run of the finger conveyor 150 is driven in the opposite direction from the upper run of the cross conveyor 56 by a reverse direction gear box 160 secured to the rear wall of the conveyor trough 55 and having a bevel gear 162 (FIG. 13) secured to the shaft 64 of the upper cross conveyor roll 62. The gear 162 meshes with an idler gear 164 which meshes with a driven bevel gear 166 secured to the stub shaft 158. The finger conveyor drive sprocket 154 is rigidly connected to the output shaft 158 which is driven in the opposite direction from the gear 162 and the cross conveyor drive roller 62.

A plurality of spaced fingers 168 on the finger conveyor 150 engage canes and other debris received from the associated collector conveyor 54 at the debris collecting point P and urges the loose canes and debris into the trellis supported vines. In response to the harvester 22 moving away from the vines, the loose canes and debris are snagged by the trellis supported vines and are removed from the harvester as it moves away from the snagged debris.

From the foregoing description it is apparent that several embodiments of the loose vine and cane eliminator are disclosed and mechanically remove canes and other debris from the debris collecting point between the collector conveyor and the cross conveyor. Each embodiment urges the canes and other debris into the harvested vines, which vines snag the loose canes and broken portions of vine and drag them free of the harvester as the harvester moves forwardly away from the snagged debris allowing the debris to fall to the ground. Each embodiment of the vine and cane eliminator is designed to be driven by and used as an option on many existing standard conveying systems used on fruit harvesters. The use of mechanical vine eliminators on harvesters also eliminates the need for periodically stopping the harvester for hand removal of vines, and further eliminates a health hazzard and the cost of two workers who would otherwise be manually removing vines in a very dusty environment.

Although the best mode contemplated for carrying out the present invention has been herein shown and described, it will be apparent that modification and variation may be made without departing from what is regarded to be the subject matter of the invention.

We claim:

1. An apparatus for mechanically removing loose debris including long pieces of debris from a harvester, comprising;
    means for moving the harvester along the row of living plants for removing fruit and loose debris therefrom,
    first and second conveying means in said harvester with said first conveying means conveying fruit and loose debris longitudinally of the harvester to debris collecting point and said second conveying means then conveying the fruit and some debris away from said connecting point, and
    finger means movable in a direction substantially perpendicular to said first conveying means for intercepting elongated pieces of debris at said collecting point and deflecting the elongated debris and other debris attached thereto transversely of the harvester into snagging engagement with the living plants being harvested for pulling the snagged debris from the harvester in response to the harvester moving away from the snagged debris.

2. An apparatus according to claim 1 wherein the living plants are grapevines and the elongated pieces of debris are loose canes dislodged from the grapevine along with other debris attached thereto.

3. An apparatus according to claim 1 wherein said intercepting means includes a finger which contacts the elongated pieces at the debris collecting point and moves the elongated pieces into snagging engagement with the living plants.

4. A loose debris eliminator for use on a vine harvester which includes driven conveyors that receive fruit and elongated vines shaken from a row of living vines as the harvester is driven along the row, said debris eliminator comprising;
    debris pushing means movable through a debris collecting point at a substantial right angle junction in the flow path of the debris for engaging and moving long pieces of debris away from the collecting point toward the vine being harvested,
    power means for driving said debris pushing means, and
    stationary means including the living vines in the row being harvested for snagging the elongated debris and pulling the elongated debris and other debris attached thereto from the harvester in response to movement of the harvester away from the snagged debris.

5. An apparatus according to claim 4 wherein one of the driven conveyors is a cross conveyor disposed transversely of the direction of movement of the harvester and driven in a direction which moves fruit and debris shaken from the vines away from the living vines being harvested, and wherein said debris pushing means includes a debris deflecting finger disposed rearwardly of the cross conveyor and which contacts the elongated debris when moving in a direction opposite to that of the cross conveyor for moving it into snagging engagement with the living vines being harvested.

6. An apparatus according to claim 4 wherein said debris pushing means comprises a plurality of debris deflecting fingers disposed above a cross conveyor extending transversely of the direction of movement of the harvester and driven in a direction which moves the fruit and debris shaken from the vines away from the living vines.

7. An apparatus according to claim 5 wherein said finger is pivotally supported above the cross conveyor and is oscillated through the debris collecting point by said power means.

8. An apparatus according to claim 5 wherein said finger is pivotally supported below an upper run of the cross conveyor and is oscillated through the debris collecting point by said power means.

9. An apparatus according to claim 5 wherein said finger is a helical auger on an auger conveyor which is moved through the debris collecting point by said power means in a direction which will move the debris rearwardly of the harvester over the auger conveyor or will move the elongated debris into snagging engagement with the living vines being harvested.

10. An apparatus according to claim 9 and additionally comprising an endless transverse finger conveyor having an upper run disposed above and transversely of the cross conveyor, a plurality of spaced fingers on said transverse finger conveyor, and said power means including means for driving the upper run of said transverse finger conveyor toward the rear of the harvester for discharging elongated debris which moves onto the upper run of said finger conveyor over the auger conveyor for discharge onto the ground.

11. An apparatus according to claim 5 wherein said finger is one of a plurality of fingers on an endless conveyor passing through the debris collecting point and moving parallel to the cross conveyor, and wherein said upper run of said finger conveyor is driven toward said living vines by said power means.

12. A method of mechanically removing loose debris including long pieces of debris from a harvester, comprising the step of;
   moving the harvester along a row of living plants for removing fruit and loose debris therefrom,
   conveying the fruit and loose debris longitudinally of the harvester to a debris collecting point and then conveying the fruit and a portion of the debris in a first direction transversely of and away from both said collecting point and said row of plants, and
   intercepting elongated pieces of debris at said collecting point and deflecting the elongated debris and other debris attached thereto transversely of the harvester and substantially perpendicular to said row of living plants being harvested in a direction opposite to said first direction for directing said elongated pieces of debris into snagging engagement with said row for pulling the snagged debris from the harvester in response to the harvester moving away from the snagged debris.

13. A method according to claim 12 wherein the living plants are grapevines and the elongated pieces of debris are loose canes dislodged from the grapevine along with other debris attached thereto.

14. A method according to claim 12 wherein said intercepting step includes striking the elongated pieces and propelling them into snagging engagement with the living plants.

* * * * *